United States Patent
He et al.

(10) Patent No.: US 7,830,094 B2
(45) Date of Patent: Nov. 9, 2010

(54) DRIVER ARRANGEMENT FOR LED LAMPS

(75) Inventors: Xi Yuan He, Guangzhou (CN); Rui Ma, Guangzhou (CN); Giovanni Scilla, Fontane di Villorba (IT)

(73) Assignee: OSRAM Gesellschaft mit beschraenkter Haftung, Munich (DE)

(*) Notice: Subject to any disclaimer, the term of this patent is extended or adjusted under 35 U.S.C. 154(b) by 732 days.

(21) Appl. No.: 11/762,381

(22) Filed: Jun. 13, 2007

(65) Prior Publication Data

US 2007/0290625 A1 Dec. 20, 2007

(30) Foreign Application Priority Data

Jun. 15, 2006 (EP) .................................. 06425407

(51) Int. Cl.
- H05B 37/02 (2006.01)
- H05B 39/04 (2006.01)
- H02M 3/335 (2006.01)

(52) U.S. Cl. ..................................... 315/224; 363/21.12
(58) Field of Classification Search .............. 363/21.12, 363/21.16, 21.17, 21.18; 315/224, 247, 291, 315/186
See application file for complete search history.

(56) References Cited

U.S. PATENT DOCUMENTS

| | | | |
|---|---|---|---|
| 4,587,506 A * | 5/1986 | Hoeksma ..................... 336/178 |
| 5,506,764 A * | 4/1996 | Hon et al. ................ 363/21.16 |
| 5,668,704 A | 9/1997 | Higuchi |
| 6,314,004 B1 | 11/2001 | Higuchi |
| 6,359,525 B1 | 3/2002 | Mohan et al. |
| 6,400,102 B1 * | 6/2002 | Ghanem ..................... 315/291 |

FOREIGN PATENT DOCUMENTS

WO          01-57999          8/2001

* cited by examiner

Primary Examiner—Bao Q Vu
Assistant Examiner—Jue Zhang

(57) ABSTRACT

A driver arrangement for LED light sources includes a transformer having primary and secondary winding connections. A first electronic switch (SW1) controls current flow through the primary winding, and a sensing resistor is coupled to the primary winding to produce a current sensing signal. A second electronic switch (SW2) is sensitive to the sensing signal to switch off SW1 as current flow through the primary winding reaches a given threshold. SW1 is thus alternatively turned-on and off in alternating turn-on and switch-off phases to power the LED light source via the secondary winding. SW1 is a field effect transistor, preferably a MOSFET. The transformer is SELV-rated. The sensing resistor may be a variable resistor to adjust the duration of the on/off phases to permit controlled dimming.

19 Claims, 3 Drawing Sheets

DRIVER ARRANGEMENT FOR LED LAMPS

FIELD OF THE INVENTION

The invention relates to LED lamps and, more specifically, to driver arrangements for LED lamps.

DESCRIPTION OF THE RELATED ART

Light emitting diodes (or LEDs) are meeting with an increasing success in their use as lighting sources, that is as lamps. This applies particularly to so-called high-flux (HF) LED lamps.

Conventional driver arrangements for LED lamps typically implement self-oscillating fly-back topologies with bipolar transistor and basic transformer structure, which are unable to provide any consistent safety insulating barrier. As a consequence, no "hot" parts of the circuitry can be left exposed and all the components in the driver arrangement must be enclosed within an insulating housing (comprised e.g. of plastics such as polycarbonate). In practice, such arrangements can be applied only to simple battery chargers and low-power (1-2 W) LED lamps. Additionally, these prior art solutions do not lend themselves to implement a dimming function.

OBJECT AND SUMMARY OF THE INVENTION

The need is therefore felt for high-efficiency and low-cost/low-size driver arrangements for LED lamps such as e.g. self-ballasted high-flux, dimmable LED lamps.

The object of the invention is to properly satisfy such as a need.

According to the present invention, that object is achieved by means of driver arrangement for LED lamps having the features set forth in the claims that follow. The claims are an integral part of the disclosure of the invention provided herein.

In brief, a preferred embodiment of the arrangement described herein takes the form of self-oscillating fly-back topology based on a MOSFET and a SELV-rated transformer with the provision of an adjustable output control. As is known, SELV is an acronym for Safety Extra Low Voltage.

The preferred embodiment of the arrangement described herein has i.a. the following advantages:

high efficiency and dimming capability,
low part count and low cost (no ICs are required),
compact size,
current peak-on time and transition mode off-time control to provide inherent compensation to LED low voltage tolerance and variations, without the need of resorting to LED current closed-loop control,
inherent compensation of LED current drift over temperature without having to resort to closed-loop control arrangements or temperature sensing devices (e.g. NTC/PTC resistors).

BRIEF DESCRIPTION OF THE ANNEXED REPRESENTATIONS

Figure 1:
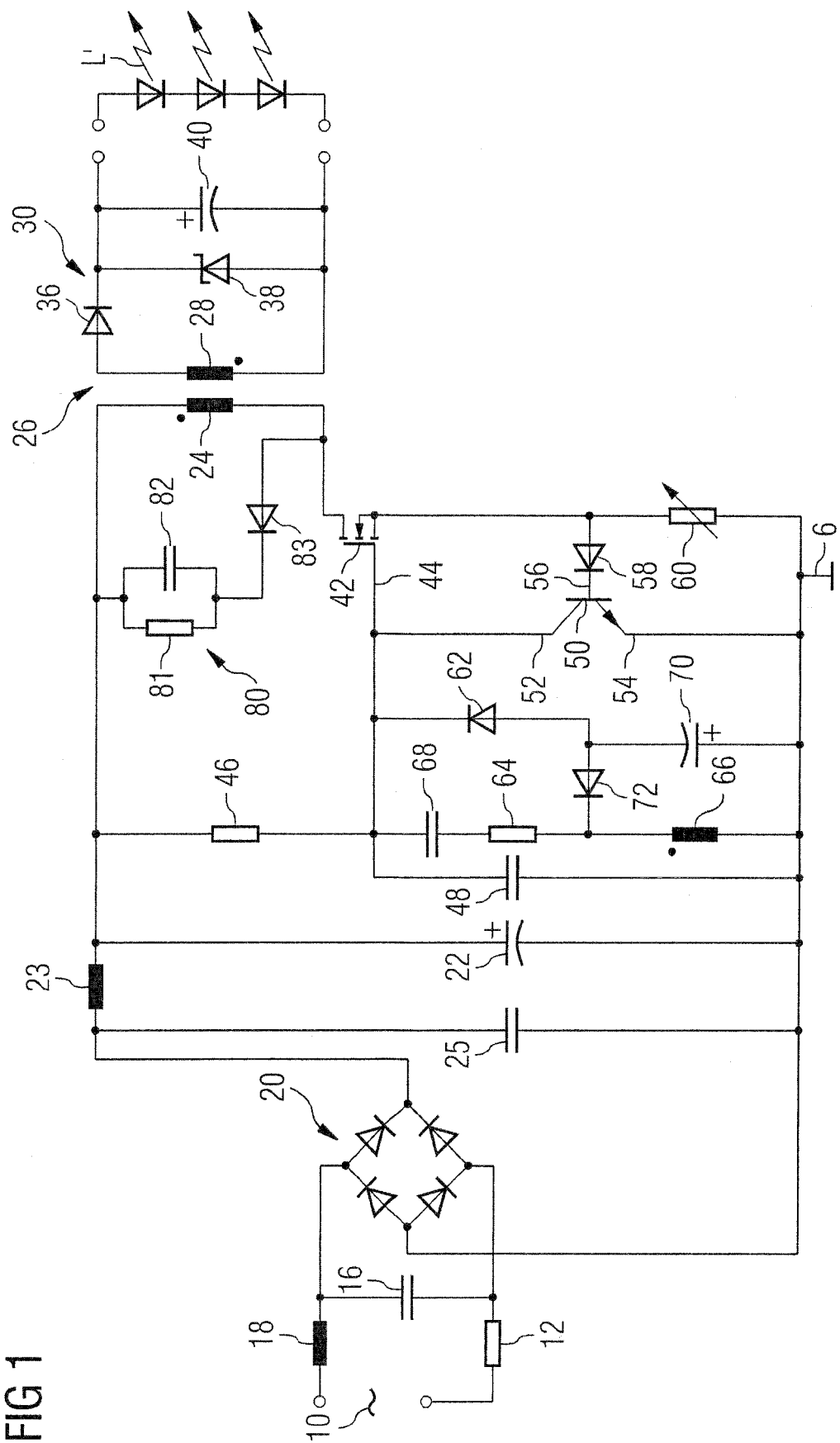
Figure 2:
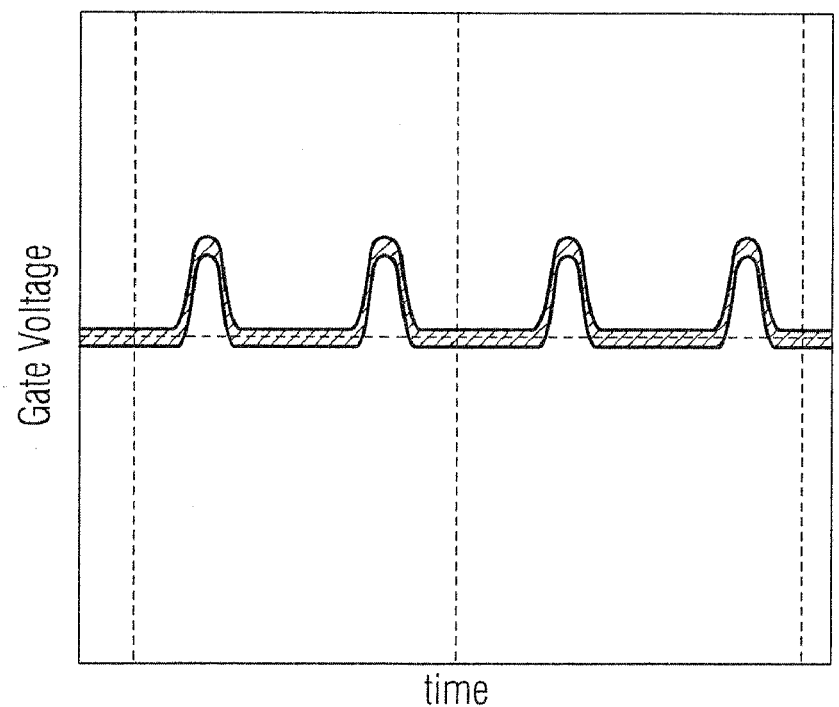
Figure 3:
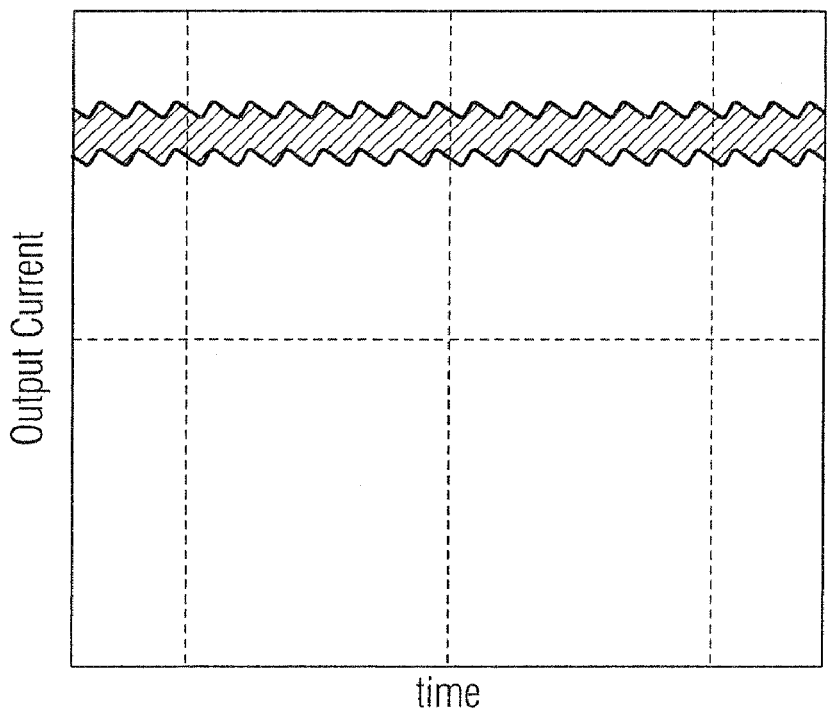
Figure 4:
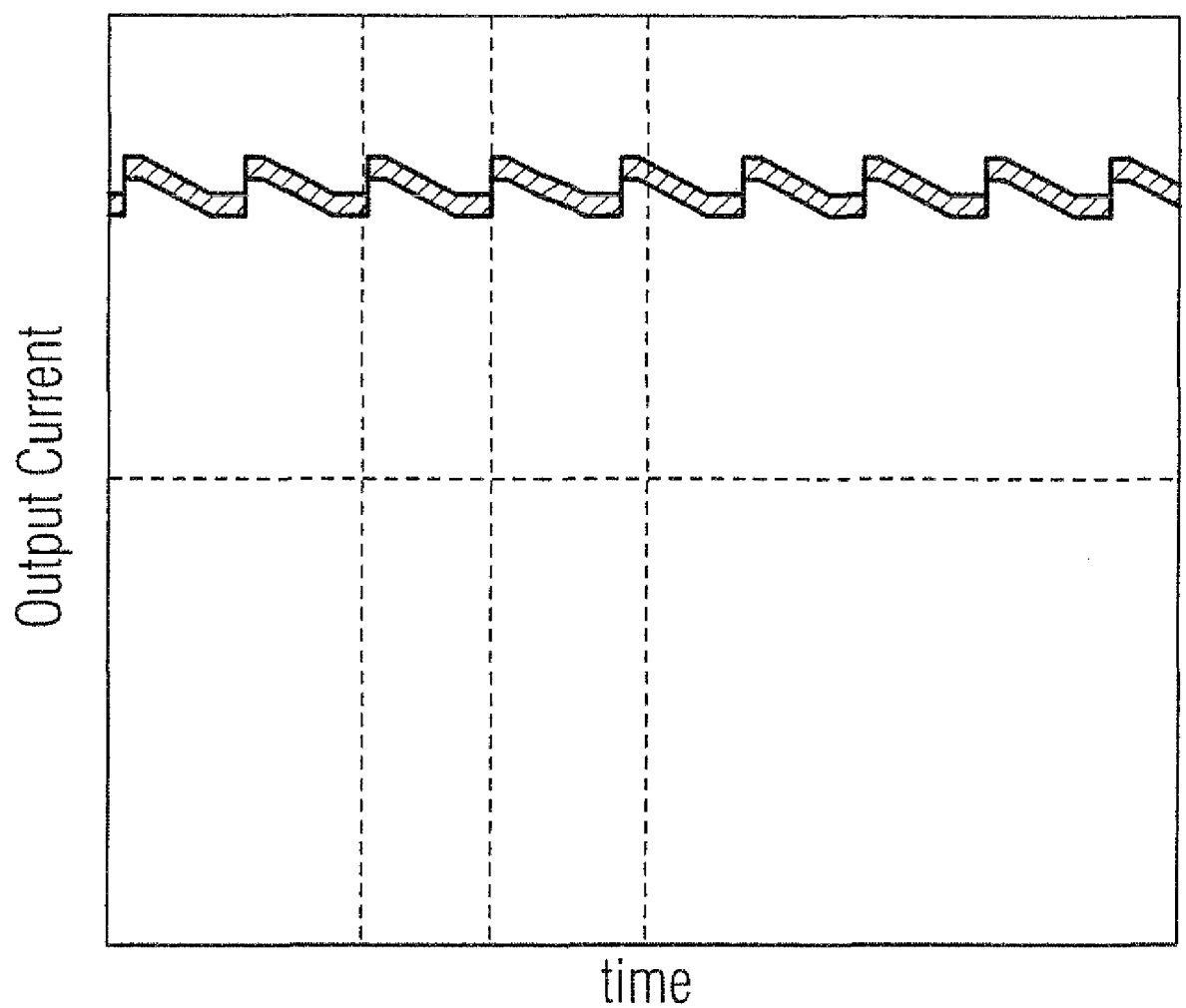

The invention will now be described, by way of example only, with the reference to the enclosed figures of drawing, wherein:

FIG. 1 is a circuit diagram of an exemplary embodiment of the arrangement described herein, and FIGS. 2 to 4 are representative of typical signal waveforms produced during operation of the circuit arrangement of FIG. 1.

DETAILED DESCRIPTION OF PREFERRED EMBODIMENTS OF THE INVENTION

The circuit diagram of FIG. 1 is representative of a driver circuit for use in feeding one or more LED lighting sources L from a mains input voltage applied between two input terminals 10.

The mains input voltage applied across the terminal 10 goes first through an Electro-Magnetic Interference (EMI) filter. This is typically comprised e.g. of a resistor 12 having cascaded thereto a low-pass LC filter comprised of a capacitor 16 and an inductor 18. The filtered input voltage is then fed to a bridge rectifier 20 to produce a rectified voltage which, after filtering via a LC network comprised of an inductor 23 and a capacitor 25, is made available across a capacitor 22, preferably comprised of an electrolytic capacitor.

The voltage across the capacitor 22 forms a so-called "DC bus voltage" (referred to ground G) which is subject to controlled switching as better detailed in the following in order to feed the primary winding 24 of a voltage step-down transformer 26. The secondary winding 28 of the transformer 26 feeds the LED lamp or lamps L via a low-voltage rectifier section 30. The low-voltage rectifier section 30 is typically comprised of a rectifier diode 36, a zener diode 38 and a further capacitor 40, preferably comprised of an electrolytic capacitor, to level out voltage and reduce current ripple.

Those of skill in the art will promptly appreciate that, while representative of the currently preferred embodiment of the arrangement described herein, the solution described in the following is generally suitable for use between, on the one hand, any type of known circuits adapted to produce a DC bus voltage and, on the other hand, any transformer whose secondary winding is adapted to feed LED light sources via any known type of low-voltage rectifier.

Current conduction (i.e. "on" periods) in the primary winding 24 of the transformer 26 is controlled via an electronic switch 42 comprised of a MOSFET. The MOSFET 42 has its source-drain current path connected in series with the primary winding 24 of the transformer 26 across the DC bus voltage.

Switching of the MOSFET 42 between "on" (i.e. saturation) and "off" (i.e. cut-off) states is controlled via the gate terminal 44 of the MOSFET 42. The gate terminal 44 is connected to the intermediate point of a series connection of a resistor 46 and a capacitor 48 again connected across the DC bus voltage (i.e. in parallel to the capacitor 22).

Reference numeral 50 denotes a bipolar transistor (of the n-p-n type in the exemplary case illustrated here) having its collector 52 and emitter 54 connected to the drain of the MOSFET 42 and to ground G, respectively.

The base terminal 56 of the bipolar transistor 50 is connected via a rectifier diode 58 to the connection point of the source of the MOSFET 42 and one end of a resistor 60 whose other end is connected to ground G.

The resistor 60 (which may be a variable resistor as better detailed in the following) is thus connected in series with the primary winding 24 of the transformer 26 in the source-drain path of the MOSFET 42. Therefore, the resistor 60 acts as a sensing resistor of the current flowing through the primary winding 24 of the transformer 26. The voltage developed across the resistor 60 (which is applied between the base 56 and the emitter 54 of the bipolar transistor 50) is thus indicative of the intensity of the current flowing through the primary winding 24 of the transformer 26.

References 64 and 66 indicate a resistor and a feedback winding forming a sort of a polarization network connected to the intermediate point between the resistor 46 and the capacitor 48 via a capacitor 68 for DC rejection. Reference 70 designates a capacitor (preferably of the electrolytic type) connected in series with a first diode 72 between ground G and the intermediate point between the resistor 64 and the winding 66. A further diode 62 has its anode connected to the intermediate point between the capacitor 70 and the diode 72 and its cathode connected to the collector 52 of the transistor 50. The diode 62 (preferably a zener diode) acts as a protection to limit the energy provided to the gate 44 of the MOSFET 42 when no energy is absorbed by the output network 30, i.e. when the load L is disconnected.

Finally, reference 80 denotes as a whole a snubber network connected across the primary winding 24 of the transformer 26. The network 80 includes a resistor 81 connected in parallel to a capacitor 82, with the parallel connection of the resistor 81 and the capacitor 82 in turn series-connected to a diode 83.

When the circuit illustrated in FIG. 1 is first turned on, the DC bus voltage created across the capacitor 22 charges the capacitor 48 via the resistor 46 (in fact, also the capacitor 68 charges, but for the time being the role of the feedback winding 66 and the circuitry associated therewith will be neglected).

A very high value (e.g. 10 Mohm) is selected for the resistor 46 so that loading of the capacitor 48 is achieved via a relatively small current derived from the DC bus voltage built up across the capacitor 22.

When the voltage across the capacitor 48 (which dictates the voltage between the gate 44 of the MOSFET 42 and ground G) reaches the gate-to-source threshold voltage Vgs of the MOSFET 42, the MOSFET 42 is turned on thus producing a current flow through the source-drain current path of the MOSFET 42 and thus through the primary winding 24 of the transformer 26.

The increasing intensity of current flowing through the primary winding 24 of the transformer 26 is sensed by the resistor 60 and a correspondingly increasing voltage drop is applied (with the intermediary of the diode 58) across the base-emitter junction of the (previously cut-off) bipolar transistor 50.

When the corresponding conduction threshold is exceeded, the bipolar transistor 50 starts conducting and rapidly brought to saturation, so that the bipolar transistor 50 will short-circuit to ground G the gate 44 of the MOSFET 42, which is correspondingly "opened".

The current in the primary winding 24 of the transformer 26 will thus rapidly decrease, and the auxiliary winding 66 will correspondingly produce a reverse voltage to pull down the electric level between the gate 44 and the source of the MOSFET 42. At this point, the secondary winding 28 of the transformer 26 (whose polarity is typically opposite to the polarity of the primary winding 24) will yield its power towards the LED light lamp(s) L via the circuitry 30.

A first operational cycle of the circuits will thus completed once the power stored in the transformer 26 is completely transferred to the secondary winding 28. The cycle just described, comprised of a "turn-on" phase and a "shut-down" phase, will thus be repeated starting form a new "turn-on" phase as described in the foregoing. During that "turn-on" phase, the feedback winding 66 will produce a pump current that is delivered via the resistor 64 and the capacitor 68 and co-operates with the current flowing through the resistor 46 in charging the capacitor 48.

As indicated, the auxiliary winding 66 acts as a feedback auxiliary winding adapted to supply additional voltage to make turning-off (switch-off) of the MOSFET faster. Specifically, when the MOSFET 42 is "on", the voltage applied across the primary winding 24 of the transformer 26 is mirrored buy the winding 66, which thus reinforces the positive bias at the gate 44 via the network comprised of the resistor 64 and the capacitor 68 (the winding 66 has the same polarity of the primary winding 24).

When the bipolar transistor 50 is turned on (and the MOSFET 42 is turned off) the "mirrored" voltage applied on the winding 66 becomes negative (fly-back phase). The capacitor 70 is charged via the diode 72 and biases the off state of the MOSFET 44 again via the network comprised of the resistor 64 and the capacitor 68. This state is maintained until the energy transfer phase from the secondary winding 28 of the network 30 is completed.

To sum up the arrangement just described operates in a hybrid fashion, i.e. with a constant value for Ton (i.e. the "on" time for the MOSFET 42—dictated by the elements designated 50, 58, and 60) and a transition mode Toff (i.e. the "off" time for the MOSFET 42), whose duration is dictated by the energy transfer from the secondary winding 28, which in turn is dependent on the load voltage.

The current on the load L is constant since to a lower voltage on the load L there corresponds a lower frequency and thus a lower energy/power transferred to the load. The on-off frequency at 42 varies subservient on the operating parameters (i.e. the load L, the characteristics of the transformer 26, the operating temperature).

The relative durations of the subsequent "turn-on" and "shut-down" phase of the MOSFET 42 will be dictated (other parameters remaining unchanged) by the value of the resistors 60. Making such value variable (that is selecting a variable resistor as the resistor 60) makes it possible to vary the relative durations of the "turn-on" and "shut-down" phases. This can be substantially equated to varying the duty cycle of the current pulses delivered towards the lamp(s) L via the secondary winding 28 of the transformer 24. The power-per-cycle value transferred to the LED lamp(s) can be varied accordingly, thus making it possible to perform an effective dimming action of sets of these sources.

A typical frequency associated with the cycle comprised of the turn-on/shut-down phases described in the foregoing is in the range of e.g. 40 kHz, which avoids any risk of undesired blinking of the LED lamp(s) L.

The time diagram of FIG. 2 is schematically exemplary of a typical time behaviour of the gate voltage of the MOSFET 42.

The diagrams of FIGS. 3 and 4 are exemplary of typical time behaviours of the output current waveforms applied to the LED lamp(s) L for different values of the resistor 60.

Of course, without prejudice to the underlying principles of the invention, the details and the embodiments may vary, even significantly, with respect to what has been described and illustrated, just by way of example, without departing from the scope of the invention as defined in the annexed claims.

The invention claimed is:

1. A driver arrangement for a LED light source, the arrangement including: a transformer having a primary winding and a secondary winding, said secondary winding connectable to said LED light source to feed power thereto, a first electronic switch to control current flow through said primary winding of said transformer, a sensing resistor coupled to said primary winding of said transformer to produce a sensing signal indicative of the intensity of current flow through said primary winding, a second electronic switch sensitive to said sensing signal to switch off said first electronic switch as said current flow through said primary winding of said transformer reaches a given threshold, whereby said first electronic switch is alternatively turned-on and off in alternating turn-on and switch-off phases to feed power to said LED light source via said secondary winding, wherein said first electronic switch is a field effect transistor, preferably a MOSFET and wherein said sensing resistor is a variable resistor to selectively adjust the duration of said turn-on and switch-off phases to thereby permit controlled dimming of said LED light source.

2. The arrangement of claim 1, wherein said transformer is a SELV-rated transformer.

3. The arrangement of claim 1, wherein said primary winding and secondary winding of said transformer have opposite polarities.

4. The arrangement of claim 1, wherein said secondary winding of said transformer has associated therewith low-voltage rectifier circuitry to feed the power to said LED light source through said low-voltage rectifier circuit.

5. The arrangement of claim 1, wherein said field effect transistor has its source-drain current path connected in series with said primary winding of said transformer.

6. The arrangement of claim 1, wherein said sensing resistor is series connected to the source-drain current path through said field effect transistor.

7. The arrangement of claim 1, wherein said second electronic switch is a transistor.

8. The arrangement of claim 7, wherein said second electronic switch is a bipolar transistor.

9. The arrangement of claim 8, wherein said bipolar transistor is connected with its base/emitter junction sensitive to the voltage drop across said sensing resistor.

10. The arrangement of claim 1, wherein said primary winding of said transformer is fed via a DC bus voltage selectively switched by said first electronic switch.

11. The arrangement of claim 10, wherein said first electronic switch has a control port fed from said DC bus voltage via a charge circuit that is selectively pinched to ground via said second electronic switch.

12. The arrangement of claim 1, wherein it includes an auxiliary winding acting as a feedback winding to act on said first electronic switch to speed-up current increase through said primary winding said transformer during said turn-on phases and to short circuit the voltage across said first electronic switch during said switch-off phases.

13. The arrangement of claim 2, wherein said primary winding and secondary winding of said transformer have opposite polarities.

14. The arrangement of claim 2, wherein said secondary winding of said transformer has associated therewith low-voltage rectifier circuitry to feed the power to said LED light source through said low-voltage rectifier circuit.

15. The arrangement of claim 3, wherein said secondary winding of said transformer has associated therewith low-voltage rectifier circuitry to feed the power to said LED light source through said low-voltage rectifier circuit.

16. A driver arrangement for a LED light source, the arrangement including: a transformer having a primary winding and a secondary winding, said secondary winding connectable to said LED light source to feed power thereto, a first electronic switch to control current flow through said primary winding of said transformer, a sensing resistor coupled to said primary winding of said transformer to produce a sensing signal indicative of the intensity of current flow through said primary winding, a second electronic switch sensitive to said sensing signal to switch off said first electronic switch as said current flow through said primary winding of said transformer reaches a given threshold, whereby said first electronic switch is alternatively turned-on and off in alternating turn-on and switch-off phases to feed power to said LED light source via said secondary winding, wherein said first electronic switch is a field effect transistor, preferably a MOSFET wherein said transformer is a SELV-rated transformer and wherein said sensing resistor is a variable resistor to selectively adjust the duration of said turn-on and switch-off phases to thereby permit controlled dimming of said LED light source.

17. A driver arrangement for a LED light source, the arrangement including: a transformer having a primary winding and a secondary winding, said secondary winding connectable to said LED light source to feed power thereto, a first electronic switch to control current flow through said primary winding of said transformer, a sensing resistor coupled to said primary winding of said transformer to produce a sensing signal indicative of the intensity of current flow through said primary winding, a second electronic switch sensitive to said sensing signal to switch off said first electronic switch as said current flow through said primary winding of said transformer reaches a given threshold, whereby said first electronic switch is alternatively turned-on and off in alternating turn-on and switch-off phases to feed power to said LED light source via said secondary winding, wherein said first electronic switch is a field effect transistor, preferably a MOSFET, wherein said primary winding and secondary winding of said transformer have opposite polarities and wherein said sensing resistor is a variable resistor to selectively adjust the duration of said turn-on and switch-off phases to thereby permit controlled dimming of said LED light source.

18. A driver arrangement for a LED light source, the arrangement including: a transformer having a primary winding and a secondary winding, said secondary winding connectable to said LED light source to feed power thereto, a first electronic switch to control current flow through said primary winding of said transformer, a sensing resistor coupled to said primary winding of said transformer to produce a sensing signal indicative of the intensity of current flow through said primary winding, a second electronic switch sensitive to said sensing signal to switch off said first electronic switch as said current flow through said primary winding of said transformer reaches a given threshold, whereby said first electronic switch is alternatively turned-on and off in alternating turn-on and switch-off phases to feed power to said LED light source via said secondary winding, wherein said first electronic switch is a field effect transistor, preferably a MOSFET, said secondary winding of said transformer has associated therewith low-voltage rectifier circuitry to feed the power to said LED light source through said low-voltage rectifier circuit and wherein said sensing resistor is a variable resistor to selectively adjust the duration of said turn-on and switch-off phases to thereby permit controlled dimming of said LED light source.

19. The arrangement of claim 2, wherein said field effect transistor has its source-drain current path connected in series with said primary winding of said transformer.

\* \* \* \* \*